United States Patent
Dutschke

(10) Patent No.: US 7,516,838 B2
(45) Date of Patent: Apr. 14, 2009

(54) SAFETY ARRANGEMENT FOR GRAIN AUGERS AND THE LIKE

(75) Inventor: Reginald Vernon Dutschke, Brinkworth (AU)

(73) Assignee: Auger Safe Holdings Pty Ltd., Brinkworth (AU)

( * ) Notice: Subject to any disclaimer, the term of this patent is extended or adjusted under 35 U.S.C. 154(b) by 0 days.

(21) Appl. No.: 11/628,568

(22) PCT Filed: Jun. 3, 2005

(86) PCT No.: PCT/AU2005/000793

§ 371 (c)(1),
(2), (4) Date: Dec. 10, 2007

(87) PCT Pub. No.: WO2005/118438

PCT Pub. Date: Dec. 15, 2005

(65) Prior Publication Data

US 2008/0196999 A1      Aug. 21, 2008

(30) Foreign Application Priority Data

Jun. 4, 2004    (AU) ............................. 2004902982

(51) Int. Cl.
*B65G 33/20* (2006.01)
(52) U.S. Cl. .................. 198/677; 198/676; 198/660
(58) Field of Classification Search ................. 198/657, 198/660, 666, 667, 676, 677; 464/38, 39, 464/43, 46

See application file for complete search history.

(56) References Cited

U.S. PATENT DOCUMENTS

| 2,438,637 | A | * | 3/1948 | Jansen ......................... 198/657 |
| 3,637,069 | A | * | 1/1972 | Christian et al. ............ 198/676 |
| 3,710,591 | A | * | 1/1973 | Gore et al. ..................... 464/39 |
| 4,842,126 | A |   | 6/1989 | McConnell .................. 198/666 |
| 5,875,882 | A | * | 3/1999 | Pollock ........................ 198/674 |
| 5,899,319 | A | * | 5/1999 | Jarnagin ...................... 198/666 |
| 6,533,105 | B1 |  | 3/2003 | Dutschke ..................... 198/659 |

FOREIGN PATENT DOCUMENTS

| CA | 974919 | 9/1975 | .................. 198/51 |
| GB | 2265677 | 10/1993 | |
| GB | 2312716 | 11/1997 | |
| SU | 1061721 | 12/1983 | |

* cited by examiner

*Primary Examiner*—James R Bidwell
(74) *Attorney, Agent, or Firm*—Gerald T. Bodner

(57) ABSTRACT

This invention provides an improved safety overload prevention device for a material conveying auger which includes an auger casing, a main drive shaft journalled therein and a main auger flight secured around the shaft, an intake flight section 11 secured to and extending along a tubular support sleeve 12 rotatably mounted on an intake drive shaft portion 14 which is adapted for connection to the main drive shaft of the auger so as to rotate therewith, and a clutch device 18 operatively interconnecting the tubular sleeve 12 and the drive shaft portion 14, the clutch device 18 including a radially displaceable spring loaded detent 19 movable between an engaged position wherein the tubular sleeve 12 is fast with the drive shaft portion 14 and rotates therewith, and a disengaged position wherein drive to the tubular sleeve 12 is disengaged in the event of an obstruction, such as a leg or arm being trapped in the flighting.

15 Claims, 4 Drawing Sheets

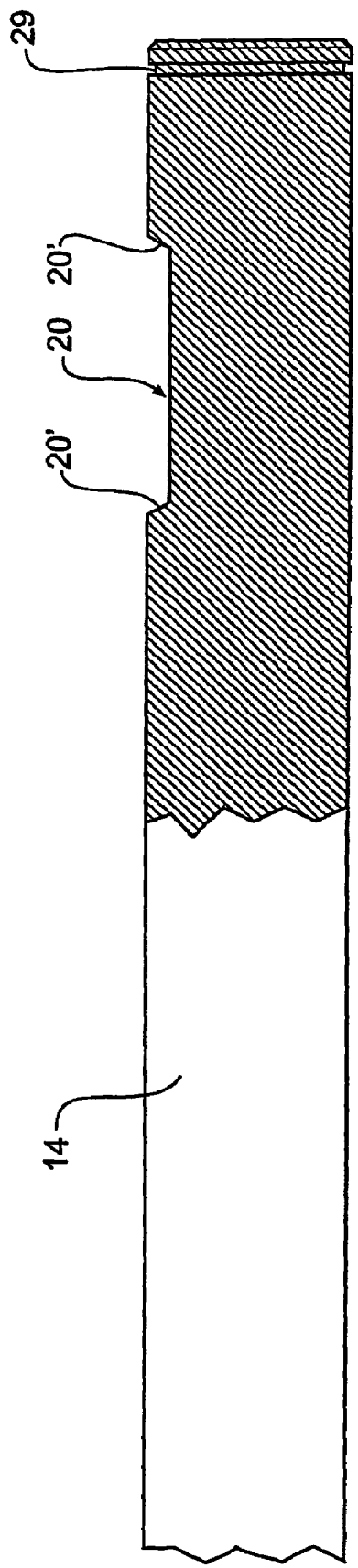
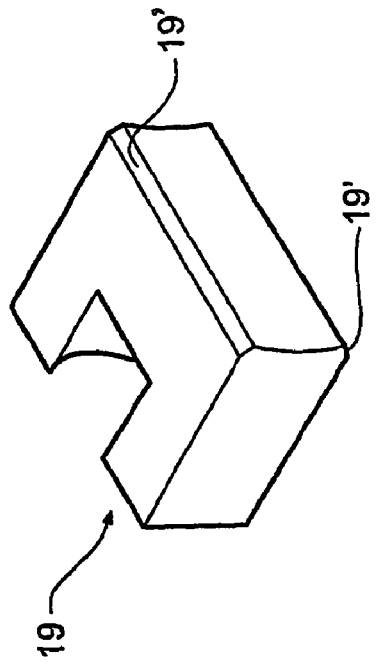
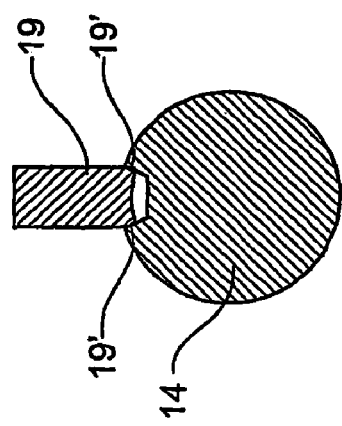
Fig 4a
Fig 4b
Fig 4c

SAFETY ARRANGEMENT FOR GRAIN AUGERS AND THE LIKE

This invention relates to improvements to augers, in particular an auger used for conveying grain or other particulate material. More specifically the invention relates to a material conveying auger having an improved safety device designed to disengage drive to the auger flighting in the event of an overload condition, eg an obstruction becoming caught in the intake end of the auger. The invention can also be applied to any auger-type tool used to convey material, such as a post-hole digger.

It is of course well known that grain augers comprise a tubular or cylindrical outer casing in which is housed a rotary feed screw or auger having a constant diameter rigid metal helical flight which extends from an intake at one end of the casing to a discharge end at the opposite end. In many instances, the intake end of the auger has a portion of the auger flighting projecting outwardly from the end of the casing and is thereby exposed. It is important therefore that measures be taken to prevent an operator (or any other person in proximity to the intake end of the auger when operating) from getting caught in the exposed intake flighting which, when embedded in a heap or pile of grain, is not visible. One of the solutions to this problem is for the intake end of the auger to incorporate an overload clutch mechanism designed so that drive to the intake end flighting is stopped in an overload situation, while still permitting the downstream portion of the auger to continue rotating to allow the transport of grain to continue through the auger. In a situation where the obstruction is a person's limb, it is vital that drive to the intake end flighting cease virtually instantaneously. An example of a safety clutch arrangement incorporated into the intake end of an auger is disclosed in U.S. Pat. No. 6,533,105 (Dutschke), wherein the clutch mechanism is constructed and arranged so that when an overload occurs, a driven clutch plate element will disengage from its driver element and drive to the auger intake flighting will cease and will not re-engage until the overload is cleared. The clutch mechanism is mounted at the outer end of the intake flighting tubular support shaft externally thereof, and is therefore exposed. This particular clutch arrangement has generally proved unsatisfactory in that it contains a number of moving parts and is not easy to adjust.

It is the main object of the present invention to provide an improved safety overload prevention device for an auger assembly which will operate to disengage drive to the intake flighting should an overload occur, eg as a result of an obstruction such as a leg or arm, becoming trapped in the auger intake.

It is a still further object of the present invention to provide an improved safety clutch device for the intake end of an auger assembly which is of simple construction and contains minimal moving parts, and is inexpensive to manufacture.

It is yet a further object of the present invention to provide an improved safety clutch mechanism for the intake end of an auger assembly which allows the amount of pre-tension or pre-load on the clutch engaging member to be readily adjusted.

Broadly according to this invention, there is provided a material conveying auger assembly of the type comprising a main drive shaft rotatable about a longitudinal axis thereof, a main flight section fixed to the shaft for rotation therewith to transfer material therealong, an intake flight section separate from the main flight section, said intake flight section comprising intake helical flighting secured to a tubular support sleeve rotatably mounted on an intake drive shaft portion which is adapted for connection to said main drive shaft so as to rotate therewith, and drive coupling means operatively interconnecting said tubular sleeve and said intake drive shaft portion, characterised in that:

said drive coupling means comprises a radially displaceable detent movable between an engaged position wherein the tubular sleeve and said drive shaft are drivingly interconnected so that the sleeve rotates with the drive shaft, and a disengaged position wherein the tubular sleeve is disengaged from said drive shaft so that the intake flighting and drive shaft rotate relative to one another, spring means biasing said radially displaceable detent in the direction of its said engaged position, said detent being housed in a detent housing secured to said intake flight section.

In a preferred embodiment, the radially displaceable detent normally engages in an elongate keyway opening formed in the periphery of the drive shaft, the detent having chamfered bottom edge faces extending along opposite sides thereof, the chamfered faces mating with complementary tapered side walls of the keyway opening to assist the "camming" disengagement of the detent when an overload condition occurs. In an overload situation, the slippage of the clutch device disengages drive to the intake flighting, while the main drive shaft continues to rotate.

Preferably the detent is formed with a central axial recessed portion to locate an end portion of a compression spring, the upper end of the spring abutting an adjustment screw which threadably engages in an internally threaded through bore of a boss which forms part of said detent housing, said boss projecting radially outwards through a portion of one of the convolutions of the intake helical flighting. With this arrangement the adjustment screw is easily accessible and can be readily adjusted by an operator to adjust the pre-load or tension applied by the spring to the detent.

Desirably the safety clutch detent housing is moulded into the leading flight of the intake helical flighting on the non-driving side thereof so as to avoid any interference to the flow of grain along the intake flighting.

Desirably, the clutch device is lubricated by means of oil contained in the annular gap between the drive shaft and auger support sleeve, there being appropriate seals at opposite ends of the auger support sleeve.

In order to more fully explain the present invention, a preferred embodiment thereof is described hereunder in some further detail with reference to and as illustrated in the accompanying drawings wherein:

FIG. 2 is an enlarged fragmentary perspective view of the clutch device shown in FIG. 1; while FIG. 3 is an exploded perspective view of the auger assembly shown in FIG. 1 but without the moulded auger flighting extending along its support sleeve or tube; while FIG. 4(a) is a partly sectioned elevational view of the auger intake drive shaft;

FIG. 4(b) is a sectional end view of the intake drive shaft with the clutch detent in its engaged position; while FIG. 4(c) is a perspective view of the clutch detent.

Figure 1:
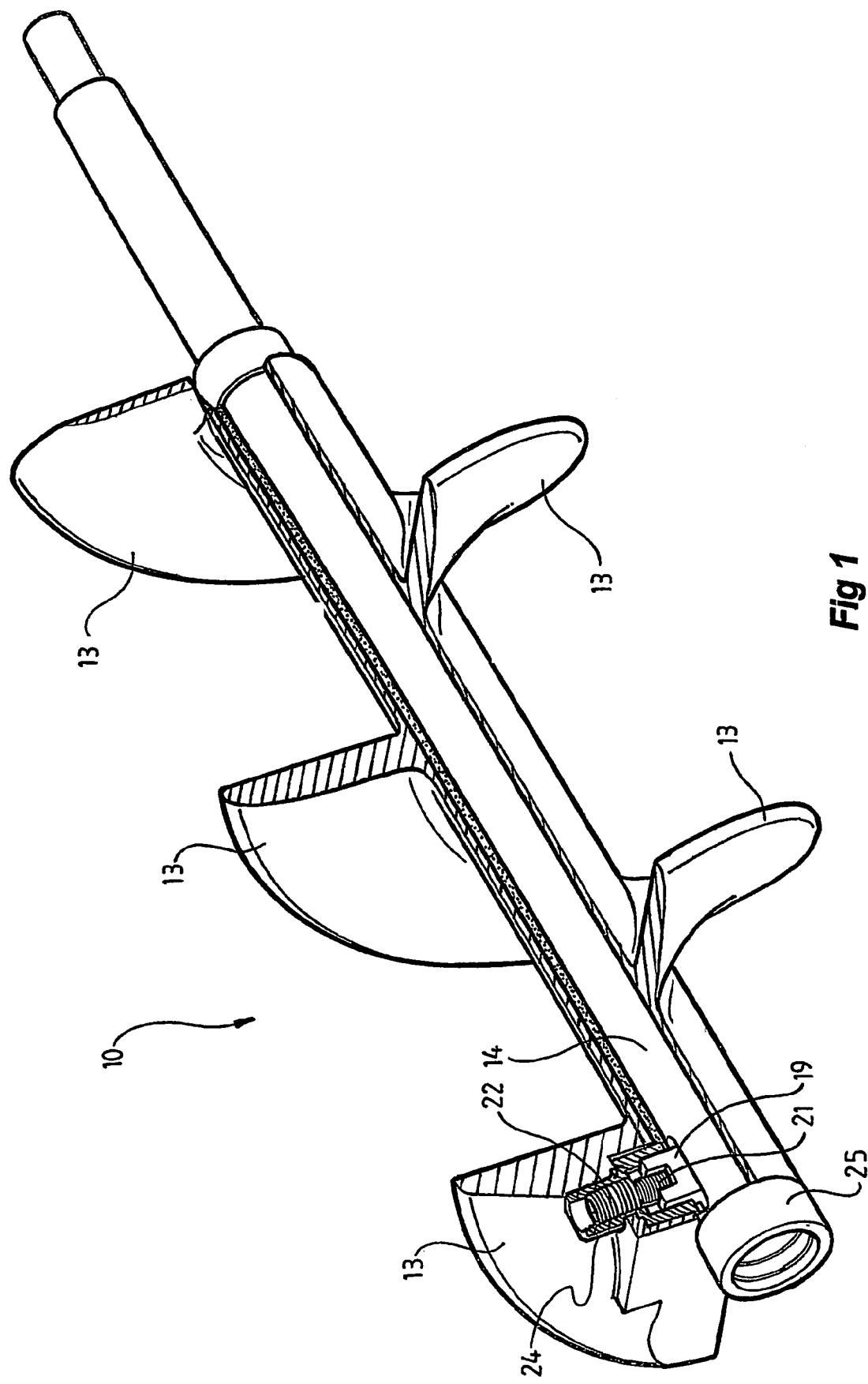
FIG. 1 is a partly cut-away perspective view of an auger assembly showing the safety clutch device incorporated therein.
Figure 2:
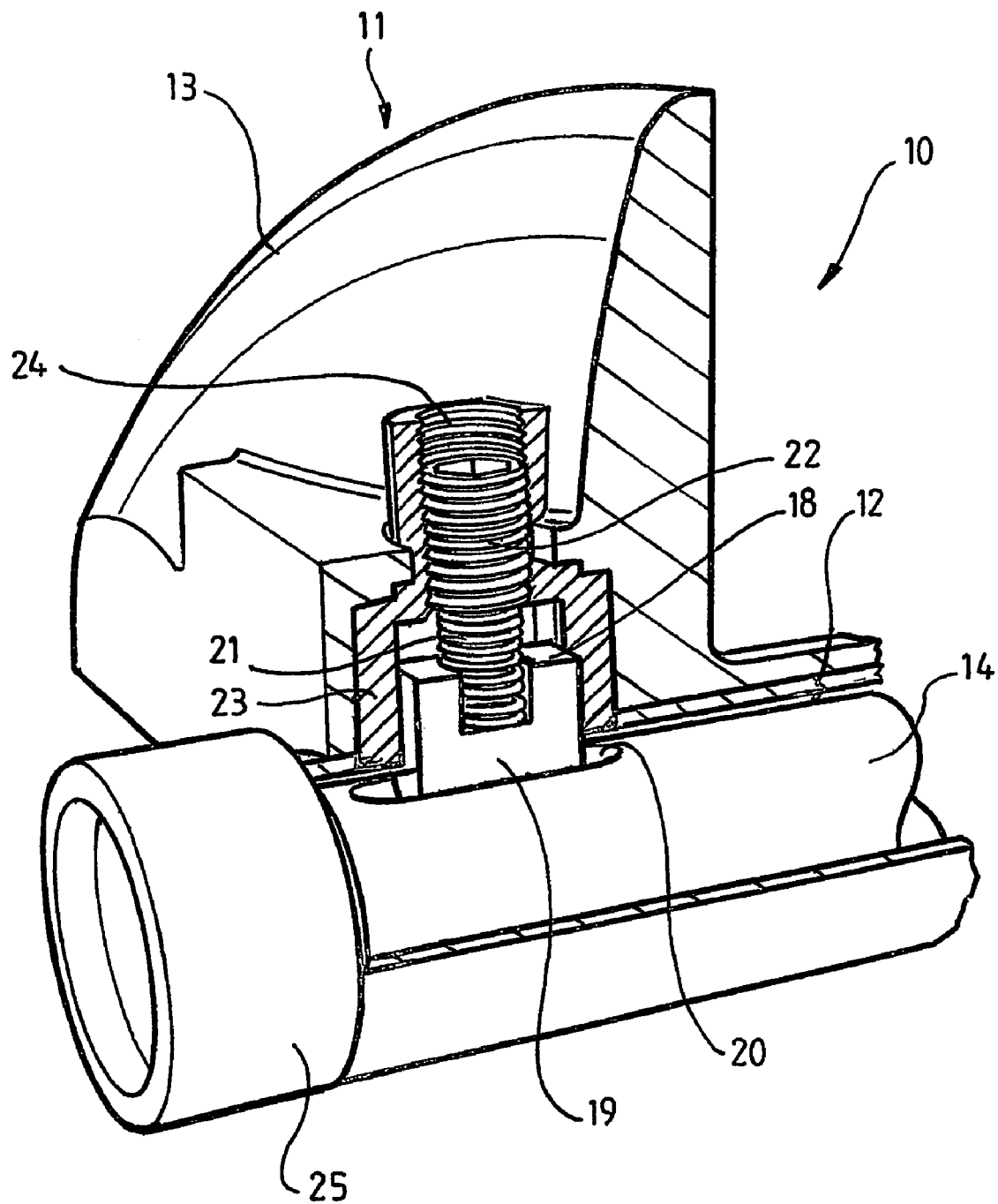

In this embodiment, the invention is described with reference to a grain auger unit which has an intake sub-assembly coupled to a main auger screw having a main drive shaft which drives both the intake flighting section and the main flighting section. An example of this is shown in U.S. Pat. No. 6,533,105 (FIG. 1 thereof), the contents of which are incorporated herein by reference.

Referring to the accompanying drawings, there is shown an auger intake assembly 10 comprising an intake flighting section 11 which in turn comprises a metal tubular sleeve portion 12 and helical flighting 13 secured, eg by moulding, thereto. In this embodiment the flighting 13 is moulded from a suitable elastomeric material so as to provide a significant degree of flexibility in the area of the flighting. The tubular support sleeve 12 is rotatably mounted on a solid drive shaft 14 which at its inner end is directly coupled to the main drive shaft of the main auger (not shown) so as to rotate therewith and forms a coaxial extension thereof.

Adjacent the outer end of the drive shaft 14 is a safety clutch device 18 arranged to drivingly couple the intake flighting tubular support sleeve 12 to drive shaft 14. The clutch device 18 includes a radially displaceable detent or lug 19 which normally engages in an elongate keyway opening or slot 20 formed in the periphery of the drive shaft 14, under the influence of a coil spring 21, with the force of the coil spring 21 being adjusted by means of an adjustment screw 22. The movable detent 19 is snugly housed in a hardened steel housing 23 which is secured to the metal sleeve 12, eg by welding, and extends through the moulded flighting 13 of the intake section 11, while the adjustment screw 22 threadably engages in an internally threaded tubular boss 24 which joins to and projects radially outwards from the detent housing 23, with the inner end of the screw 22 abutting against the outer end of the coil spring 21. As will be evident, the detent 19 is biased into engagement with the keyway 20 in order to drivingly interconnect the intake flighting section 11 and the drive shaft 14 so as to rotate together. In the event, however, of an overload situation, the detent 19 and its associated keyway 20 are designed in such a way that the detent will "cam out" of the keyway opening 20, against the bias of the spring 21 so as to disengage drive to the intake helical flighting 13, with the drive shaft 14 continuing to rotate. The camming disengagement is facilitated by the metal detent 19 having bevelled bottom edges 19' which matingly engage radially inwardly convergent side walls 20' of the keyway opening 20. Once the overload condition is removed, the clutch detent 19 will re-engage in the keyway 12 in order to resume drive to the intake helical flighting 13.

Figure 3:
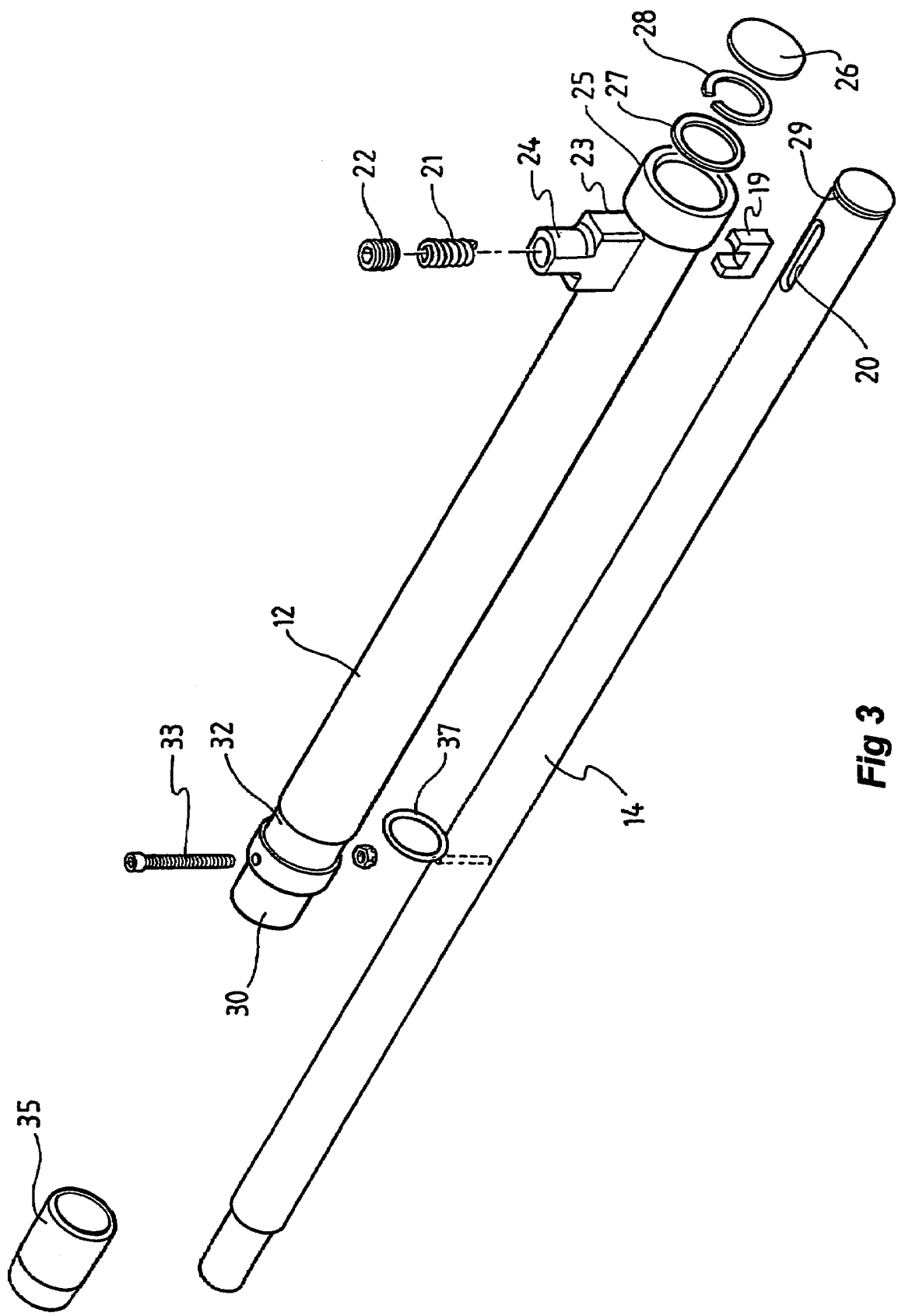

As shown in FIG. 3, the outer end of the metal support sleeve or tube 12 has a bush 25 secured, by welding, thereto. A stainless steel welsh plug 26 together with washer 27 sealingly close off the outer end of the sleeve 12. The end of shaft 14 is journalled for rotation in the bush 25 and retained by means of circlip 28 which locates in a circumferential groove 29 formed adjacent the end of shaft 14.

Intermediate the ends of drive shaft 14 is a co-axial adaptor sleeve 30 fast therewith, the adaptor sleeve 30 locating over collar 32 secured to the other inner end of sleeve 12. A radial pin 33 passes through the sleeve 30 and shaft 14. The sleeve 30 facilitates the centralisation of the inner end portion of the shaft 14 within the hollow shaft of an existing auger (not shown). The main flighting of the existing auger will, when the clutch is engaged, align with and abut the trailing end of the intake flighting 13. The other inner end of shaft 14 is journalled in a bearing 35 which also assists in co-axially aligning the drive shaft 14 with the main drive shaft of the main auger.

An o-ring 37 locates in an internal groove formed in the collar 32 so as to effect a seal between the drive shaft 14 and the other inner end of the tubular sleeve 12. Lubricating oil is contained in the annular space between the drive shaft 14 and sleeve 12 to lubricate the clutch detent 19 and assist in dissipating heat. To prevent leakage of oil past the adjustment screw 22, desirably a sealant is applied on the internal threads of the hollow boss 24 so that a seal is effected when the screw 22 is screwed in place.

It is an advantage that the clutch device 18 is moulded into the body of the helical flighting 13 and therefore is not exposed to external forces or contamination which might impair its function.

The amount of pre-tension or pre-load on the clutch detent 19 will depend on the degree to which the coil spring 21 is compressed upon tightening the adjustment screw 22. This will of course determine the amount of force needed to disengage the detent 19 from its keyway opening 20 in the drive shaft 14. Desirably the clutch device 18 is designed so that an amount of approximately 1½ mm radial movement of the detent 19 will disengage the clutch. Desirably, a limit stop is incorporated into the boss 24 of the detent housing, at the bottom of its threaded section, so that the adjustment screw 22 cannot be inadvertently tightened by an operator to the point where the clutch detent cannot disengage. Generally, the clutch device will be pre-set to a working position and sealed by a closure plug inserted into the end of the boss so that an operator does not attempt to alter the pre-set tension of the clutch spring.

It should be appreciated that the invention can be applied to any screw-type conveyor or auger which has several modular sections of flexible flighting having separately clutched connections therebetween. Furthermore, the feed intake of an auger may be located midway along its length, in which case the intake flighting section will be fitted between sections of the main drive shaft.

A brief consideration of the above described embodiment will indicate that the invention provides for a very simple, economical safety feature for a material conveying auger which is effective to significantly reduce the risk of serious injury or damage being suffered by a person in a situation where his or her limb becomes caught in the intake flighting of the auger, by virtue of drive to the intake flighting section being automatically disengaged.

It will be understood that the invention is not necessarily limited to the details of the preferred embodiment described hereinabove, but is capable of numerous modifications and substitutions without departing from the spirit and scope of the invention.

The invention claimed is:

1. A material conveying auger assembly of the type comprising a main drive shaft rotatable about a longitudinal axis thereof, a main flight section fixed to the shaft for rotation therewith to transfer material therealong, an intake flight section separate from the main flight section, said intake flight section comprising intake helical fighting secured to a tubular support sleeve rotatably mounted on an intake drive shaft portion which is adapted for connection to said main drive shaft so as to rotate therewith, and drive coupling means operatively interconnecting said tubular sleeve and said intake drive shaft portion, characterised in that:

said drive coupling means comprises a radially displaceable detent movable between an engaged position with the intake drive shaft portion wherein the tubular sleeve and said intake drive shaft portion are drivingly interconnected so that the sleeve rotates with the drift shaft portion, and a disengaged position so as to disengage drive to the tubular sleeve, spring means biasing said radially displaceable detent in the direction of its said engaged position, said detent being housed in a detent housing secured to said tubular support sleeve, said housing having an open radially inner end.

2. A material conveying auger assembly according to claim 1 wherein said detent housing is integral with and extends through a portion of said intake helical fighting.

3. A material conveying auger assembly according to claim 2 wherein said detent housing is located on the non-driving side of the leading convolution of the intake helical fighting.

4. A material conveying auger assembly according to claim 1 wherein said intake drive shaft portion has an elongate keyway opening formed in its periphery, said detent, when in its engaged position, engaging in said keyway opening.

5. A material conveying auger assembly according to claim 4 wherein said keyway opening has radially inwardly converging side walls which respectively engage bevelled bottom edges on said detent when the detent is in its engaged position.

6. A material conveying auger assembly according to claim 1 wherein said detent is a rectangular shaped lug having a centrally located part circular slot which opens outwardly, said spring means comprising a compression spring which locates in said slot.

7. A material conveying auger assembly according to claim 6 wherein said detent housing has an internally threaded outwardly projecting hollow boss, wherein an adjustment screw threadably engages in said internally threaded boss of said detent housing with the inner end of said adjustment screw abutting the outer end of the spring.

8. A material conveying auger assembly according to claim 7 wherein the boss extends through a portion of one of the convolutions of the intake helical fighting so that its outer end is exposed.

9. A material conveying auger assembly according to claim 1 wherein a sealed annular gap is formed between the drive shaft and the auger support sleeve, said gap extending between opposite ends of the tubular sleeve, said gap being filled with oil to lubricate the clutching detent.

10. A safety clutch device for an auger unit having a drive shaft rotatable about a longitudinal axis thereof, helical fighting secured to a tubular support sleeve rotatably mounted on said drive shaft, said clutch device operatively interconnecting the drive shaft and the tubular support sleeve, wherein said clutch device comprises a radially displaceable detent moveable between an engaged position wherein the tubular sleeve and said drive shaft rotate together, and a disengaged position wherein the tubular sleeve is disengaged from said drive shaft whereby drive to the tubular sleeve is disengaged,
   spring means biasing said radially displaceable detent in the direction of its said engaged position,
   said detent being housed in a radially outwardly projecting detent housing fixed to said tubular support sleeve.

11. safety clutch device according to claim 10 wherein said detent housing is moulded into said intake helical fighting on the non-driving side of one of its convolutions.

12. A safety clutch device according to claim 10 wherein said drive shaft has an elongate keyway opening formed in its periphery, said detent, when in its engaged position, engaging in said keyway opening.

13. A safety clutch device according to claim 10 wherein said spring means comprises a compression coil spring, one end of which seats against a surface of said detent, the other end of which abuts against an inner end of an adjustment screw which threadably engages in an internally threaded bore portion of said detent housing.

14. A safety clutch device according to claim 13 wherein said internally threaded bore portion of the detent housing extends through a portion of one of the convolutions of the helical fighting so that its outer end is exposed.

15. A safety clutch device according to claim 11 wherein said drive shaft has an elongate keyway opening formed in its periphery, said detent, when in its engaged position, engaging in said keyway opening.

* * * * *